United States Patent Office 3,505,294
Patented Apr. 7, 1970

3,505,294
METHOD FOR PRODUCING COPOLYESTER AND RESULTING PRODUCT
Masao Ishii, Makoto Yamada, and Takeshi Imaida, Ohtake-shi, Japan, and Hiroshi Terada, deceased, late of Ohtake-shi, Japan, by Kimiko Terada, administratrix, Ohtake-shi, Japan, assignors to Mitsubishi Rayon Co., Ltd., Tokyo, Japan, a corporation of Japan
No Drawing. Continuation-in-part of application Ser. No. 434,129, Feb. 19, 1965. This application June 18, 1968, Ser. No. 738,736
Claims priority, application Japan, Feb. 22, 1964, 39/9,724
Int. Cl. C08g 17/08
U.S. Cl. 260—75          5 Claims

ABSTRACT OF THE DISCLOSURE

A method of producing a novel copolyester capable of being formed into fibers or films having improved dyeability, which comprises reacting terephthalic acid or dimethyl terephthalate with ethylene glycol and, as a third component, a branched glycol having an ether linkage in the main chain and at least one side chain containing an ether linkage; the produced copolyester has substantially the same mechanical properties as those of polyethylene terephthalate.

CROSS-REFERENCE TO RELATED APPLICATION

This is a continuation-in-part of application Ser. No. 434,129 filed Feb. 19, 1965, now abandoned.

This invention relates to a linear polyester and a method for producing the same. More particularly, this invention relates to a copolycondensate of a linear polyester having superiority in various properties, particularly in dyeability and a method for producing the same.

It has been well known that polyethylene terephthalate, a resin, commercially valuable for the manufacture of fibers and films, can be produced from terephthalic acid or its functional derivative and ethylene glycol. Through polyethylene terephthalate shows, in general, superior characteristics in mechanical properties because of its high melting point and high crystalline property, it still has important problems which must be solved for the purpose of being used in fibers and films on various points, such as dyeability, static and pilling property. On investigating the recent studies on the production of a linear polyethylene terephthalate, it is found that the number of studies relating to the solution of the above-mentioned drawbacks is notably increasing. This endorses the fact that the above-mentioned drawbacks are practically very important problems which must be solved.

An object of the present invention is to provide a copolyester having superiority in dyeability, particularly dyeability for disperse dyes. Another object of the present invention is to provide a copolyester having improved static and pilling properties. A further object is to provide a method for producing the above-mentioned copolyester.

The present invention consists in adding at least one branched glycol represented by the general formula:

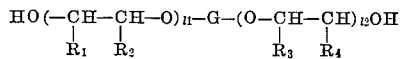

wherein

G is an alkylene having 2 to 6 carbon atoms or a group expressed by the formula —$CH_2(CH_2OCH_2)_nCH_2$— (wherein $n$ is an integer from 1 to 3),
one of the $R_1$ and $R_2$ is a group expressed by the formula, —$[CH_2(OCH_2CH_2)_mOR]$ and the other is hydrogen, one of the $R_3$ and $R_4$ is a group expressed by the formula —$[CH_2(OCH_2 \cdot CH_2)_mOR]$ and the other is hydrogen, (wherein $m$ is 0, 1 or 2, and R is hydrocarbon having 1 to 18 carbon atoms),
both $l_1$ and $l_2$ are 0 or positive integers which satisfy the relation $4 \geq l_1 + l_2 \geq 1$ and when G is
—$CH_2(CH_2OCH_2)_nCH_2$— (wherein $n$ is an integer from 1 to 3), the relation $4-n \geq l_1 + l_2 \geq 1$ is satisfied by them, to at least one dibasic acid or its functional derivative and at least one glycol, hydroxy acid, or its functional derivative to produce a copolymer in the method of producing a polyester.

Generally speaking, the dyeability of fibers is governed by the diffusion of dye molecules into the interior of fibers and the strength of mutual action of dye and fibers, namely, by the compactness of fiber structure, the degree of crystallinity, the size of non-crystalline part, the flexibility of molecular chain, the strength of affinity between dye and fibers, and the like, therefore, because of high crystalline property, small size of non-crystalline part, compactness of internal structure, slow rate of diffusion of dye due to the nature of hydrophobic fibers, it is difficult to dye polyester fibers.

By the introduction of branched glycol having the above-mentionel general formula containing hydrophillic ether bond in the main and side chains, the non-crystalline region of fibers produced from copolyesters according to the present invention, becomes greater and since water molecules entered therein make the fibers swell and accelerate the diffusion of dye-molecules into fibers, the receptivity of dyes is exceedingly increased and the shade of dyed materials is also improved.

In order to attain the object of the present invention, it is desirable to add 1 to 40 mol percent, preferably 2 to 15 mole percent, of the compound represented by the above-mentioned general formula based on acid component at an optional stage of reaction.

As to the reason for limiting the amount of addition, when the amount of addition is too large, the depression of melting point and softening point is remarkable, the maintenance of balance of mechanical properties becomes difficult and the practical value is, thereby, lost. When it is too small, the satisfactory improvement of dyeability cannot be expected.

According to the embodiments of present invention, copolyesters capable of providing fibers and films are produced by adding a compound having the above-mentioned general formula to the essential constituents of aromatic dibasic carboxylic acid or its dialkyl ester and aliphatic glycol, aromatic diol, aromatic hydroxymonocarboxylic acid, or alkyl ester thereof and subjecting the resulting mixture to melt-polymerization or solid-phase polymerization. Particularly preferable kinds of copolyesters are produced from lower alkyl esters of terephthalic acid, ethylene glycol and 2 to 15 mole percent, based on the acid component, of the above-mentioned compound.

The polyethylene terephthalate which is modified by the compound represented by the above-mentioned general formula according to the present invention, i.e. glycol having either bond in the main and side chains, is one kind of preferable component of the present invention but a polyester which is modified by the compound represented by the above-mentioned general formula according to the present invention is a mouldable, straight chain polyester and includes all such polyesters having a melting point higher than 200° C.

Illustrative acid components useful in the production of such polyester include aromatic dibasic carboxylic acid, such as terephthalic acid, 4,4'-diphneylmethane dicarboxylic acid, diphenoxyethane dicarboxylic acid, 2,6 and 2,7-naphthalene dicarboxylic acid, but terephthalic acid is commercially most important. Typical glycol components include ethylene glycol, trimethylene glycol, tetramethylene glycol, hexamethylene glycol, decamethylene glycol, 1,4-cyclohexane dimethanol, p-xylylene glycol but ethylene glycol and 1,4-cyclohexane dimethanol are important commercially. Further, representative hydroxy-monocarboxylic acids include p-hydroxy benzoic acid, p-hydroxymethyl benzoic acid and p-hydroxyethoxy benzoic acid.

The application of the present invention is not limited to the cases of the above-mentioned dicarboxylic acid or its functional derivative and glycol. Needless to say, the present invention can be applied also to the cases of copolymers produced by the copolymerization with a small amount of the third component, e.g. the case of copolymer of terephthalic acid, ethylene glycol and several mole percent of the third component of isophthalic acid or adipic acid.

The glycols having side chain represented by the above-mentioned general formula are illustrated by $\beta,\beta'$-dihydroxy-$\alpha'$(or $\beta'$)-methoxymethyl-diethylether,
$\beta,\beta'$-dihydroxy-$\alpha'$(or $\beta'$)-ethoxymethyl-diethylether,
$\beta,\beta'$-dihydroxy-$\alpha'$(or $\beta'$)-propoxymethyl-diethylether,
$\beta,\beta'$-dihydroxy-$\alpha'$(or $\beta'$)-butoxymethyl-diethylether,
$\beta,\beta'$-dihydroxy-$\alpha'$(or $\beta'$)-hexyloxydimethyl-diethylether,
$\beta,\beta'$-dihydroxy-$\alpha'$(or $\beta'$)-decyloxymethyl-diethylether,
$\beta,\beta'$-dihydroxy-$\alpha'$(or $\beta'$)-lauryloxymethyl-diethylether,
$\beta,\beta'$-dihydroxy-$\alpha'$(or $\beta'$)-phenoxymethyl-diethylether,
$\beta,\beta'$-dihydroxy-$\alpha'$(or $\beta'$)-benzyloxymethyl-diethylether,
$\beta,\beta'$-dihydroxy-$\alpha'$(or $\beta'$)-methoxyethoxymethyl-diethylether,
$\beta,\beta'$-dihydroxy-$\alpha'$(or $\beta'$)-ethoxyethoxymethyl-diethylether,
$\beta,\beta'$-dihydroxy-$\alpha'$(or $\beta'$)-propoxyethoxymethyl-diethylether,
$\beta,\beta'$-dihydroxy-$\alpha'$(or $\beta'$)-butoxyethoxymethyl-diethylether,
$\beta,\beta'$-dihydroxy-$\alpha'$(or $\beta'$)-phenoxyethoxymethyl-diethylether,
$\beta,\beta'$-dihydroxy-$\alpha'$(or $\beta'$)-methoxyethoxyethoxymethyl-diethylether,
$\beta,\beta'$-dihydroxy-$\alpha'$(or $\beta'$)-butoxyethoxyethoxymethyl-diethylether,
$\beta,\beta'$-dihydroxy-$\beta$-methyl-$\alpha'$(or $\beta'$)-methoxymethyl-diethylether,
$\beta,\beta'$-dihydroxy-$\beta$-methyl-$\alpha'$(or $\beta'$)-decyloxymethyl-diethylether,
$\beta,\beta'$-dihydroxy-$\alpha$-methyl-$\alpha'$(or $\beta'$)-methoxyethoxymethyl-diethylether,
$\delta$-hydroxybutyl-$\beta'$-hydroxy-$\alpha'$(or $\beta'$)-hexyloxymethyl-ethylether,
$\delta$-hydroxybutyl-$\beta'$-hydroxy-$\alpha'$-(or $\beta'$)-ethoxyethoxymethyl-ethylether,
1-($\beta$-hydroxyethoxy)-2-{$\beta'$-hydroxy-$\alpha'$(or $\beta'$)-butoxymethylethoxy}-ethane,
1-($\beta$-hydroxyethoxy)-2-{$\beta'$-hydroxy-$\alpha'$(or $\beta'$)-propoxyethoxymethylethoxy}-ethane,
1,2-bis($\beta$-hydroxy-$\alpha$-ethoxymethyl-ethoxy)-ethane,
1,2-bis($\beta$-hydroxy-$\beta$-butoxyethoxymethylethoxy)-ethane,
1-($\beta$-hydroxyethoxy)-1-propoxyethoxymethyl-2-($\beta'$-hydroxy-$\alpha'$-propoxyethoxymethyl-ethoxy)-ethane, and similar substitutes of tetraethylene glycol.

These compounds can easily be synthesized by reacting a glycol, such as ethylene glycol or diethylene glycol with an epoxy compound, such as a glycidyl ether represented by the general formula:

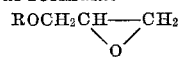

(R: alkyl, aryl or aralkyl) disclosed in "Faserforschung und Textiltechnik" 13 (1962), Haft 11, pp. 490–494 or

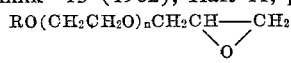

(R is the same as defined above and $n$ is 1–10) disclosed in U.S. Patent No. 3,372,143, in any desired molar ratio in the absence of a catalyst or in the presence of an acidic catalyst, such as boron trifluoride, sulfuric acid or the like, or a basic catalyst, such as metallic alkali, caustic alkali or the like, in a known manner as disclosed in, for example, British Patent No. 420,903 and "Chemical Abstracts" 53 3051e (1959), to open the oxide ring of the epoxy compound.

In the practice of the present invention, the reaction is carried out in three steps. In the first step, the charged raw materials are heated at about 65° to 290° C., preferably 150° to 225° C., for 30 minutes to 10 hours, preferably 1.5 to 5 hours, under atmospheric or a reduced pressure in an atmosphere of an inert gas, such as nitrogen. In the second step of polycondensation, the reaction is carried out under a gradually reduced pressure. In the final step, heating is continued at 200° to 360° C., preferably 230° to 320° C., for 30 minutes to 20 hours, preferably 1 to 10 hours, under a reduced pressure lower than 5 mm. Hg in an atmosphere of an inert gas to complete the reaction. In the process, various additives are generally used for the purpose of promoting the reaction, improving the quality of polymers and delustering. In the present invention, such additives as used in the production of a polyester are not always necessary but, in general, the use of additives is preferable. As such additives, various catalysts, such as organic carboxylates of calcium, zinc, lead and manganese, antimony trioxide and tetrabutoxy titanium; stabilizers, such as phosphoric acid and phosphorous acid; and delustering agents, such as titanium dioxide, are illustrated. The amount of the additive added varies according to kinds, reaction conditions and the like, but, in general, about 0.0005 to 5 percent of polyester produced is suitable.

The copolyester produced by the present invention are useful for producing shaped articles generally by extrusion, casting or other methods. The resulting shaped articles can be fabricated into yarns, fabrics, bristles, films, sheets, ribbons or the like by a further treatment. The products have an advantage of being readily dyed by disperse dyes.

The following examples are given to illustrate the present invention, but it will be understood that the examples are not intended to limit the scope of the invention. In each example, parts are expressed by parts by weight unless otherwise indicated. $\eta$sp./c. is a value measured at 35° C. by dissolving polymer in a solvent mixture of 50 parts phenol and 50 parts tetrachloroethane to a concentration of 0.5 g./100 ml.

EXAMPLE 1

Two hundred parts of dimethyl terephthalate, 142 parts of ethylene glycol, 24.5 parts (10 mole percent based on acid component) of $\beta,\beta'$-dihydroxy-$\beta'$-butoxyethoxymethyl-diethylether (B.P.=154°–156° C./0.5 mm. Hg, $n_D^{35}$=1.4470), which was prepared by reacting ethylene glycol with butoxyethyl glycidyl ether in a molar ratio of 20:1 in the presence of 0.2 mile percent (based on the glycidyl ether used) of $BF_3O(C_2H_5)_2$ at 45° C. for 4 hrs., 0.20 part of zinc acetate, and 0.20 part of antimony trioxide were charged into a reaction tube, subjected to the ester-exchange reaction at 190° C. for 3 hours under a nitrogen stream and a greater part of methanol was distilled off. Subsequently, the reaction mixture was heated to 250° C., evacuated, and subjected to polycondensation at 270° C. for 4 hours under a vacuum of 0.5 mm. Hg. The resulting polymer had a melting point of 241° to 2450 C. and $\eta$sp./c. of 0.631.

This polymer was subjected to common melt spinning process and then to stretch-heat treatment. The resulting fibers were dyed in a dye bath containing 2% OWF (on the weight of fibers) of disperse dye: Eastman Polyester Blue BLF, 4% OWF of Disper HTD and 0.4 ml./l. of acetic acid with a liquor ratio of 100:1, at 98° C. for 90 minutes, whereby they were deeply dyed.

On the other hand, unmodified polyethylene terephthalate prepared under the same conditions as in the present example produced only fibers of from light to medial shade. The effect of modification was apparent.

EXAMPLE 2

Hundred sixty parts of dimethyl terephthalate, 100 parts of ethylene gylcol, 10.8 parts (8 mole percent based on acid component) of $\beta,\beta'$-dihydroxy-$\beta'$-ethoxymethyl-diethyl ether, which was prepared by reacting ethylene glycol with ethyl glycidyl ether in the same manner as disclosed in Example 1, 0.24 part of calcium acetate, and 0.10 part of lithium oxalate were charged into a reaction tube. After heating at 190° C. for 4 hours under a stream of nitrogen, the temperature was elevated to 250° C. and the reaction tube was evacuated. The condensation was carried out at 275° C. under a reduced pressure of 1.0 mm. Hg for 5 hours. The resulting polymer was colorless, had a melting point of 250° to 254° C. and $\eta$sp./c. of 0.563. The resulting polymer was subjected to a common spinning process and then to stretching. The resulting fibers were dyed in a bath containing 2 percent OWF of Eastman Polyester Red B, 4 percent OWF of Disper-HTD and 0.4 ml./l. of acetic acid with a liquor ratio of 100:1, at 98° C. for 90 minutes. As a control, the same dyeing was applied to unmodified polyethylene terephthalate fibers produced under the same conditions as those of present example but only attained light shade.

EXAMPLE 3

Ninety two parts of dimethyl terephthalate, 62 parts of ethylene glycol, 7.0 g. (5 mole percent of DMT) of 1-($\beta$ - hydroxyethoxy) - 2 - {$\beta'$-hydroxy - $\beta'$ - butoxyethoxymethylethoxy}-ethane, which was prepared by reacting diethylene glycol with butoxyethyl glycidyl ether in the same manner as in Example 1, 0.10 part of lead acetate and 0.10 part of antimony trioxide were charged into a glass reaction tube. After heating at 190° C. for 3 hours under a stream of nitrogen, the temperature of the reaction mixture was elevated to 270° C. and the polycondensation was carried out at 270° to 275° C. for 3.5 hours under a vacuum of 0.6 mm. Hg. The resulting light yellow compound had a melting point of 251° to 254° C. and $\eta$sp./c. of 0.45.

EXAMPLES 4–6

Thirty eight parts of dimethyl terephthalate, 26 parts of ethylene glycol, 0.04 part of manganous acetate, 0.02 part of antimony trioxide and one of the following three glycols were charged into a reaction tube, and by the copolymerization, polyesters having high melting points and high viscosities were obtained.

|  | Example 4 1-($\beta$-hydroxyethoxy)-2-($\beta'$-hydroxyphenoxymethylethoxy)-ethane | Example 5 ($\delta$-hydroxybutylpropoxyethoxymethyl)-ethylether | Example 6 1,2-bis($\beta$-hydroxy-$\beta$-butoxyethoxymethylethoxy)-ethane |
|---|---|---|---|
| Amount of additives | 7 | 9 | 5. |
| Ester exchange reaction | 190° C. for 3.5 hours. | 190° C. for 3.5 hours. | 190° to 210° C. for 4.5 hours. |
| Polycondensation reaction | 275° C. for 4.5 hours. | 270° C. for 4.5 hours. | 270° C. for 3.5 hours. |
| Melting point | 243° to 246° C | 241° to 245° C | 252° to 254° C. |
| $\eta$sp/c | 0.58 | 0.55 | 0.39. |
| Color of polymer | Light yellow | White | Light brown. |

The compounds added in Examples 4, 5 and 6 were prepared from diethylene glycol and phenyl glycidyl ether; 1,4-butane diol and propoxyethyl glycidyl ether; and ethylene glycol and an excess of butoxyethyl glycidyl ether, respectively.

EXAMPLE 7

Nine hundred twenty parts of dimethyl terephthalate, 710 parts of ethylene glycol, 0.70 part of zinc acetate, 0.50 part of antimony trioxide and 84 parts (7.5 mole percent based on acid component) of $\beta,\beta'$-dihydroxy-$\beta$-propoxyethoxymethyl-diethyl ether, which was prepared by reacting ethylene glycol with propoxyethyl glycidyl ether in the same manner as in Example 1, were charged into a stainless steel reactor equipped with a rectifying column and heated under agitation at 190° C. for 3.5 hours. After distilling off of methanol, the pre-polycondensate was transferred to an autoclave reactor. After heating at 260° C. under atmospheric pressure for 30 minutes then, under a vacuum of 100 to 200 mm. Hg for 30 minutes and of 25 mm. Hg for 10 minutes 0.90 part of triphenyl phosphite were added. Further, the polycondensation was carried out at 270° C. under a vacuum of 0.25 mm. Hg for 5.5 hours whereby a white polymer having $\eta$sp./c.=0.890 measured in phenol-tetrachloroethane, and a melting point of 243° to 245° C. was obtained.

The resulting polymer was melted in a screw type extruder at 280° C., extruded from a spinneret with 6 holes and wound up at a velocity of 600 m./min.

The resulting undrawn yarns were stretched at 90° C. 4.6 times the original length and heat-treated at 140° C. whereby tough fibers having tenacity of 4.0 g./d. and elongation of 34 percent were yielded.

The resulting fibers were dyed in a dye bath containing 2 percent OWF of various disperse dyes, 0.4 ml./l. of acetic acid and 4 percent of Disper-HTD, with a liquor ratio of 100:1, at 98° C. for 90 minutes. The results of dyeing are shown in the following table. It is evident that the dyeability of these fibers is much superior to that of unmodified polyethylene terephthalate.

DYE RECEPTIVITY OF MODIFIED POLYESTERS OF POLYETHYLENE TEREPHTHALATE

| Disperse dye | Modified polyester, percent | Unmodified polyethylene terephthalate, percent |
|---|---|---|
| Eastman polyester blue BLF | 74.0 | 54.5 |
| Eastman polyester red B | 75.9 | 18.7 |
| Eastman polyester yellow 3GL | 52.3 | 24.1 |

EXAMPLE 8

Thousand parts of dimethyl terephthalate, 760 parts of ethylene glycol, 100 parts (10 mole percent based on acid component) of $\beta,\beta'$-dihydroxy-$\beta'$-methoxymethyldiethylether, which was prepared by reacting ethylene glycol with methoxyethyl glycidyl ether in the same manner as in Example 1, 0.3 part of manganous acetate were charged into a stainless steel reactor and heated at 200° C. for 3.5 hours under stirring. After distilling-off of methanol, 0.75 part of phosphorous acid and 0.25 part of antimony trioxide were added. The resulting pre-polycondensate was transferred to an autoclave reactor and the reaction was carried out at 270° C. under a vacuum of 0.7 mm. Hg for 5 hours. The resulting white polymer had a melting point of 242° to 245° C. and $\eta$sp./c. of 0.75.

The polymer was subjected to spinning with a extruder-type spinning apparatus at an extrusion temperature of 275° C. and at a take-up speed of 650 m./min., and further to stretching 4.2 times the original length at 95° C., whereby tough fibers having tenacity of 3.5 g./d. and elongation of 22 percent were obtained. These fibers were dyed with a dye bath containing 2 percent OWF of disperse dye, Eastman Polyester Red B with a liquor ratio of 100:1, at 98° C. for 90 min., whereby the fibers were dyed in deep color and showed the dye-receptivity of 75.2 percent. On the other hand, unmodified polyethylene terephthalate fibers prepared under the same conditions for the purpose of comparison were dyed only in light color and showed the dye-receptivity of only 19.7 percent.

EXAMPLE 9

Thousand parts of dimethyl terephthalate, 750 parts of ethylene glycol, and 0.75 part of calcium acetate were charged into a stainless steel reactor. After heating at 190°–230° C. for 3 hours, 100 parts (7.5 parts based on acid component) of $\beta,\beta'$-dihydroxy-$\beta'$-phenoxyethoxymethyl-diethylether, which was prepared by reacting ethylene glycol with phenyl glycidyl ether in the same manner as in Example 1, were added and further 1.5 parts of triphenyl posphite and 0.3 part of antimony trioxide were added. Resultsing prepolycondensate was transferred to an autoclave reactor and the reaction was carried out at 275° C. under a vacuum of 1.2 mm Hg for 4 hours, whereby white polymer having a melting point of 245°–247° C. and $\eta$sp./c. of 0.62 was obtained.

This polymer was subjected to spinning at 280° C. and then to stretching 3.9 times the original length, whereby fibers having tenacity of 2.7 g./d. and elongation of 26.6 percent were obtained. These fibers were dyed in a dye-bath containing 100 percent OWF of Eastman Polyester Blue BLF with a liquor ratio of 100:1, at 98° C. for 90 minutes by which 18 g. per 100 g. fibers of dye adsorption was shown. On the other hand, unmodified polyethylene terephthalate fibers prepared under the same conditions showed only 2 g. per 100 g. fibers of dye adsorption.

EXAMPLE 10

Eight hundred sixteen parts of dimethyl terephthalate, 612 parts of ethylene glycol, 64 parts of $\beta,\beta'$-dihydroxy-$\beta'$-lauryloxymethyl-diethylether, which was prepared by reacting ethylene glycol with lauryl glycidyl ether in the same manner as in Example 1, and 0.5 part of magnesium acetate were charged into a stainless steel reactor and heated at 195° to 220° C. under stirring for 3 hours. After distilling-off of calculated amount of methanol, 0.8 part of phosphoric acid and after heating at 20 min., 0.15 part of antimony trioxide were added. The resulting prepolycondensate was transferred to an autoclave reactor and the polycondensation was carried out at 280° C. under a vacuum of 2 mm. Hg for 3 hours whereby a polymer having a melting point of 247° to 250° C. and $\eta$sp./c. of 0.85 was obtained. After melt-spinning, this polymer was stretched at 90° C., 4.3 times the original length, and heat-treated at 115° C., whereby though fibers having tenacity of 3.3 g./d. and elongation of 43.5 percent were obtained. The fibers thus obtained were dyed in a dye-bath containing 2 percent OWF of Eastman Polyester Yellow 3GL with a liquor ratio of 100:1 at 98° C. for 90 minutes whereby medium to deep color was developed.

On the other hand, unmodified polyethylene terephthalate fibers dyed under the same conditions developed only a light color.

EXAMPLE 11

Thousand parts of dimethyl terephthalate, 760 parts of ethylene glycol, 86.5 parts of $\beta,\beta'$-dihydroxy-$\beta'$-butoxyethoxyethoxymethyl-diethylether, which was prepared by reacting ethylene glycol with butoxyethoxyethyl glycidyl ether in the same manner as in Example 1, and 0.2 part of manganous acetate were charged into a stainless steel reactor and heated at 180° to 230° C. under stirring for 4 hours. After distilling-off of methanol, 0.4 part of phosphorous acid and 0.3 part of antimony trioxide were added. The resulting pre-polycondensate was transferred to an autoclave and the reaction was carried out at 265° C. under a vacuum of 0.5 mm. Hg for 6 hours. The resulting white polymer had a melting point of 245° to 250° C. and $\eta$sp./c. of 0.64.

EXAMPLE 12

Thousand parts of dimethyl terephthalate, 780 parts of ethylene glycol, and 0.4 part of cobaltous acetate were charged into a stainless steel reactor equipped with a rectifying column and heated at 197° to 220° C. for 4 hours. After distilling-off of methanol, 98 parts of $\beta,\beta'$-dihydroxy - $\beta'$-methoxyethoxyethoxymethyl-diethylether, which was prepared by reacting ethylene glycol with methoxyethyl glycidyl ether in the same manner as in Example 1, and 1.5 parts of silicon tetraacetate were added. The resulting pre-polycondensate was transferred to an autoclave and the reaction was carried out at 265° C. under a vacuum of 1.0 mm. Hg for 7 hours. Resulting light violet polymer had a melting point of 242° to 247° C. and $\eta$sp./c. of 0.69. After spinning of this polymer and stretching of the resulting filaments by a conventional method, the resulting fibers were dyed in a dye-bath containing 5 percent OWF of Eastman Polyester Dark Red FL with a liquor ratio of 100:1 at 98° C. for 90 minutes, whereby deep color and dye-receptivity of 82 percent was obtained.

EXAMPLE 13

Five hundred parts of terephthalic acid, 316 parts of ethylene glycol, 31 parts of $\beta,\beta'$-dihydroxy-$\beta'$-ethoxyethoxymethyl-diethylether, which was prepared by reacting ethylene glycol with ethoxyethyl glycidyl ether in the same manner as in Example 1, and 0.2 part of calcium acetate were charged into an esterification reactor and stirred at 240° C. under a nitrogen atmosphere. The reaction was carried out for 2 hours at the pressure of 3.5 kg./cm.$^2$ while the evolved water is being removed.

After the reaction, 0.15 part of phosphorous acid, and 0.15 part of antimony trioxide were added and the polymerization was carried out at 270° C., under a vacuum of 0.7 mm. Hg for 5 hours whereby polymer having $\eta$sp./c. of 0.62 and a melting point of 248° to 252° C. was obtained. This polymer was subjected to the conventional spinning and stretching process and dyed with a disperse dye, Eastman Polyester Dark Red FL at 98° C. for 90 minutes whereby deep color was attained.

What is claimed is:

1. A process for producing a copolyester which comprises mixing together at least one acid component selected from the group consisting of terephthalic acid and dimethyl terepthalate, with ethylene glycol and from 1 to 40 mol percent, based on the acid component, of a branched glycol having the formula:

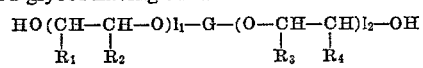

wherein G is one member selected from the group consisting of alkylene groups having from 2 to 6 carbon atoms and groups having the formula:

—CH$_2$(CH$_2$OCH$_2$)$_n$CH$_2$— in which $n$ is an integer of from 1 to 3; one of R$_1$ and R$_2$ is hydrogen and the other is a group of the formula:

one of R$_3$ and R$_4$ is hydrogen and the other is a group of the formula:

in which formula $m$ is 0 or an integer of from 1 to 2, R is a hydrocarbon residue having from 1 to 18 carbon atoms: $l_1$ and $l_2$ each are 0 or an integer of from 1 to 4, and satisfy the relation of $4 \geq l_1+l_2 \geq 1$ and where G is —CH$_2$(CH$_2$OCH$_2$)$_n$CH$_2$— in which $n$ is an integer of from 1 to 3, $l_1$ and $l_2$ satisfy the relation of

heating the resulting mixture at a temperature of from 65° to 290° C. to react the mixture and then further heating the mixture at a temperature of from 200° to 360° C. at a pressure of less than 5 mm. Hg until a fiber-forming copolyester is produced.

2. A process according to claim 1, wherein the branched glycol is a compound having the formula:

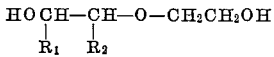

in which one of $R_1$ and $R_2$ is hydrogen and the other is a group of the formula:

—[CH$_2$(OCH$_2$CH$_2$)$_m$OR]

in which $m$ is 0 or an integer of from 1 to 2 and R is a hydrocarbon residue having from 1 to 18 carbon atoms.

3. A process for producing a copolyester which comprises mixing together at least one acid component selected from the group consisting of terephthalic acid and dimethyl terephthalate, and ethylene glycol with from 2 to 15 mol percent, based on the acid component, of a branched glycol selected from the group consisting of
β,β'-dihydroxy-α'-butoxymethyl-diethylether,
β,β'-dihydroxy-β'-butoxymethyl-diethylether,
β,β'-dihydroxy-α'-hexylonymethyl-diethylether,
β,β'-dihydroxy-β'-hexylonymethyl-diethylether,
β,β'-dihydroxy-α'-methoxyethoxymethyl-diethylether,
β,β'-dihydroxy-β'-methoxyethoxymethyl-diethylether,
β,β'-dihydroxy-α'-butoxyethoxymethyl-diethylether,
β,β'-dihydroxy-β'-butoxyethoxymethyl-diethylether,
β,β'-dihydroxy-α'-phenoxyethoxymethyl-diethylether,
β,β'-dihydroxy-β'-phenoxyethoxymethyl-diethylether,
β,β'-dihydroxy-α'-methoxyethoxyethoxymethyl-diethylether,
β,β'-dihydroxy-β'-methoxyethoxyethoxymethyl-diethylether,
β,β'-dihydroxy-α'-butoxyethoxyethoxymethyl-diethylether,
β,β'-dihydroxy-β'-butoxyethoxyethoxymethyl-diethylether,
β,β'-dihydroxy-α'-phenoxyethoxyethoxymethyl-diethylether and
β,β'-dihydroxy-β'-phenoxyethoxyethoxymethyl-diethylether, heating the resulting mixture at a temperature of from 150° to 225° C. to react the mixture and further heating the mixture at a temperature of from 230° to 320° C. at a pressure within the range of 0.1 to 5 mm. Hg until a fiber-forming copolyester is produced.

4. A film and fiber-forming copolyester prepared by the process of claim 1.

5. A film and fiber-forming copolyester prepared by the process of claim 4.

References Cited

UNITED STATES PATENTS

| | | | |
|---|---|---|---|
| 2,744,087 | 5/1956 | Snyder | 260—75 |
| 3,023,192 | 2/1962 | Shivers | 260—75 |

WILLIAM SHORT, Primary Examiner

L. L. LEE, Assistant Examiner

U.S. Cl. X.R.

8—55; 260—47, 45.7